United States Patent Office 3,529,037
Patented Sept. 15, 1970

3,529,037
POLYALLOMERS AND PROCESS FOR
PREPARING SAME
Hugh John Hagemeyer, Jr., and Marvin Becton Edwards,
both of P.O. Box 2068, Longview, Tex. 75603
No Drawing. Continuation-in-part of application Ser. No.
230,702, Nov. 15, 1962. This application Oct. 25, 1966,
Ser. No. 589,217
Int. Cl. C08f *15/04*
U.S. Cl. 260—878  20 Claims

ABSTRACT OF THE DISCLOSURE

Crystalline block copolymer of propylene and at least one other α-monoolefin selected from the group of ethylene and α-monoolefinic hydrocarbons of 4 to 10 carbon atoms are disclosed. These copolymers have an inherent viscosity in Tetralin at 145° C. of from about 0.4 to about 2.68, a density of at least 0.85, a brittle point below abount 0° C. and contain at least 90 percent by weight of polymerized propylene

---

The present application is a continuation-in-part of applicants' copending applications Ser. Nos. 230,702 and 230,703 both filed Oct. 15, 1962 as continuations-in-part of Ser. No. 152,001 filed Nov. 13, 1961 (no abandoned) as a continuation-in-part of Ser. Nos. 28,826 filed May 13, 1960 and Ser. No. 668,840 filed July 1, 1957 (now abandoned), said Ser. No. 28,826 being further a continuation-in-part of Ser. No. 615,775 filed Oct. 15, 1956 (issued Dec. 4, 1962 as U.S. Pat. 3,067,183), said present application further being a continuation-in-part of Ser. No. 505,227 filed Oct. 26, 1965 as a continuation of said Ser. No. 152,001, and said present application further being a continuation-in-part of Ser. No. 390,198 filed Aug. 17, 1964 as a continuation-in-part of said Ser. No. 668,840.

This invention relates to novel polymers and methods for preparing the same. More particularly, the present invention relates to novel, solid, block copolymers, called polyallomers, prepared from propylene and other α-monoolefinic hydrocarbons and to processes for their preparation. The propylene-ethylene polyallomers in particular have superior low temperature properties.

In recent years, a number of high molecular weight polymers having a crystalline structure have been prepared, particularly from olefins, by subjecting the monomer to relatively mild conditions of temperature and pressure in the presence of solid stereospecific polymerization catalysts. It is known that α-olefins such as propylene can be polymerized to relatively high molecular weight solid polymers by subjecting the monomer to relatively mild conditions of temperature and pressure in the presence of ionic catalyst mixtures. The polymerization procedures employing such catalyst mixtures can be carried out at temperatures ranging from below room temperature as, for example, temperatures of 0° C. to temperatures in the order of 250° C. and higher. These catalysts are also effective at pressures from atmospheric to very high pressures in the order to 30,000 p.s.i. or higher although only slight superatmospheric pressures are usually required and hence pressures up to 1000 p.s.i. are ordinarily employed. Such polymers have been used extensively in a number of different applications including, for example, use in fibers, molding and coating applications, depending upon the specific properties of the polymer. The prior art crystalline polymers are, however, deficient as wholly desirable polymers for many uses since they do not exhibit the combination of good stiffness, tensile strength, elongation, impact strength, hardness and brittle point necessary for such uses.

It is evident, therefore, that the state of the art will be greatly enhanced by providing a class of propylene polymers and crystalline block copolymers of an α-olefin in which is combined good stiffness, tensile strength, elongation, impact strength, hardness, Vicat softening point and brittle point. Likewise, a noteworthy contribution to the art will be methods for preparing such polymers.

Accordingly, it is an object of this invention to provide novel block copolymer compositions.

Another object of this invention is to provide new propylene polymers having low brittle points.

Still another object is to provide novel copolymers comprising propylene and α-monoolefins which copolymers have low brittle points.

Still another object of this invention is to provide novel copolymers comprising propylene and another α-monoolefin, for example, ethylene, which exhibit brittle points as low as −50° C.

Still another object of this invention is to provide novel propylene copolymers containing as little as 5 percent of a second α-monoolefinic monomer which copolymers will exhibit brittle points as low as −40° C.

Still another object of this invention is to provide novel block copolymer compositions which exhibit a combination of properties heretofore unattainable with homopolymers and blends thereof.

Still another object of this invention is to provide novel block copolymer compositions having significantly improved balance of properties when compared with prior art homopolymers and blends thereof.

Still another object of this invention is to provide novel block copolymer compositions which, by virtue of their improved combination of properties, are particularly useful in molding applications where they exhibit superior moldability, low mold shrinkage, lower densities, better mold finish, and optimum film forming properties when compared with most prior art homopolymers.

Still another object of this invention is to provide novel processes including two-stage and three-stage processes for preparing the aforementioned novel block copolymers.

Other objects will become apparent from an examination of the description and claims which follow.

In order to accomplish these objects it was necessary to prepare entirely new block copolymers, i.e., copolymers which in the most preferred embodiment are 100 percent insoluble in boiling hexane, which show a high degree of crystallinity and which differ markedly from prior art polymers in chemical composition and combination of physical properties. Since these novel polymers are crystalline, but differ from prior art crystalline polymers in chemical composition and superior combination of physical properties, we have chosen to call them polyallomers. The polyallomers are solid crystalline polymeric compositions in which the polymer chains comprise joined segments of two or more homopolymerized monomers. These segments exhibit crystallinity heretofore normally associated only with the homopolymers of the monomers. The number, length, and sequence of the segments comprising the polymer chain are subject to wide variation depending upon the properties desired in the polyallomers. For example, one embodiment of this invention is the polyallomers in which the polymer chains comprise two separate and distinct segments, i.e., a major or body segment or portion and a minor or tail segment or portion. The body segment is a polymerized crystalline chain of a polymerizable monomer which chain is terminated by a different polymerized monomer group. This terminating polymerized monomer group is also crystalline and comprises the minor portion of the polyallomer, by weight, when compared to the weight of body segment and is designated as the tail segment.

As indicated above there are numerous types of polyallomers depending upon the number, length, and sequence of the segments. Thus, there are di-hydrocarbon polyallomers in which each of the segments are polyhydrocarbon, for example, segments of polymerized styrene, olefinic or acetylenic hydrocarbons or mixtures thereof, as exemplified by ethylene, propylene, butene-1, butadiene, tetramethylbutadiene, isoprene, acetylene and the like. Polyallomers in which polymerized propylene is the major portion, by weight, are known as propylene polyallomers and, in such polyallomers where the minor portion is polymerized ethylene, then the polyallomer is designated as a propylene-ethylene polyallomer. Still other types of polyallomers are those in which the major portion, by weight, is polymerized propylene, and the minor portion, by weight, is polymerized ethylene and styrene. This type of polyallomer is a ternary polyallomer and would be designated propylene-ethylene-styrene polyallomer. Still other types of polyallomers are hydrocarbon-vinyl polyallomers in which the major portions are hydrocarbon, for example, polymerized propylene, and the minor portions are polymerized vinyl compounds, for example, vinyl chloride.

In a particularly desirable embodiment of this invention it has been found that solid crystalline block copolymers containing at least 80 percent by weight, of propylene, with a different α-monoolefin, prepared as described hereinafter, have very low brittle points while still retaining the desirable properties of crystalline polypropylene.

It should be understood that the block copolymers of this invention are quite different from the ordinary type of copolymer prepared heretofore. The polyallomers are not to be confused with prior art copolymers, amorphous or crystalline, since these prior art copolymers do not exhibit the excellent combination of properties or the chemical structure exhibited by the polyallomers. The copolymers of this invention are block copolymers and exhibit a very definite and precise arrangement of each of the polymer components in the polymer chain. The block copolymers of this invention can be represented as those containing a polymer chain illustrated by the formula AAAAAAAABB wherein A is the propylene component and B is the comonomer as contrasted to the random copolymers of the prior art which contain polymer chains represented by the formula AABABBA. The precise arrangement in the copolymer makes it possible, by appropriate selection of the type and amounts of each polymer component as well as the polymerization conditions and ratio of the catalyst components, to produce copolymers having a wide variety of properties in addition to the low brittle point obtained in the preferred embodiment. This wide flexibility in properties of the copolymers of this invention is not obtained with most of the prior art copolymers. It is the arrangement of the polymerized monomers in the polymer chains of the polyallomers that makes it possible for these polymers to exhibit the excellent and superior combination of physical properties disclosed.

Also, in prior art copolymers it has often been found that the product is a blend containing large amounts or mixtures of homopolymers prepared from each of the monomers. These mixtures are, of course, quite distinct from the copolymers of this invention which contain the polymer components in a single polymeric chain. The prior art products should more aptly be termed polyblends or simply mixtures of homopolymers. In preparing polyallomers it is advantageous to use no more polymerizable monomer in the process than can be incorporated in the polymer chains of the polyallomer, the exact amounts being determinable by the polyallomer being produced and the polymerization conditions employed. Thus, the polyallomers can be prepared by polymerizing segments of a polymerizable monomer onto preformed segments of the polymer chains formed from a different polymerizable monomer using a solid stereospecific polymerization catalyst.

The present crystalline propylene polyallomer or copolymeric compositions in which the polymer chains are polymerized propylene segments joined to segments of different polymerized α-monoolefinic hydrocarbons are of particular interest because these polymers exhibit excellent Vicat softening points, stiffness, impact strength, elongation, and hardness together with very low brittle points, even with extremely low percentages of α-monoolefinic hydrocarbons, for example, less than 1 percent, by weight, in the polyallomers.

The polyallomers can contain varying amounts of each of the monomers in polymeric form in a single chain, as is obvious to one skilled in the art. A wide variation of specific properties of a polyallomer can be achieved by appropriate selection of the monomers employed, the amounts of each monomer employed in preparing the polyallomer, polymerization conditions, and ratio of catalyst components used in forming the polyallomer. For example, propylene polyallomers in which the minor portion is segments of polymerized ethylene and contain only 0.2 percent, by weight, of polymerized ethylene, exhibit a brittle point of about $-12°$ C., while a propylene polyallomer of comparable melt index, in which the minor portion is segments of polymerized ethylene comprising about 5 percent, by weight, of the polyallomer exhibits a brittleness temperature of $-50°$ C.

Thus as indicated, propylene polyallomers in which the minor portion is segments of polymerized α-monoolefinic hydrocarbon other than propylene, are of particular interest by virtue of their very low brittle points even with relatively small percentages, by weight, of different α-monoolefinic hydrocarbons in the polyallomer. In order to obtain a propylene polyallomer exhibiting the optimum combination of physical properties it is desirable that the polyallomer contain at least 80 percent, by weight, of polymerized propylene and at least about 0.1 percent, by weight, of a different α-monoolefinic hydrocarbon, in polymerized form. Thus, the most desirable propylene polyallomers are those in which the major portion is segments of polymerized propylene and the minor portion is segments of different α-monoolefinic hydrocarbons in polymerized form, which polyallomers contain about 80 to about 99.9 percent, by weight, of polymerized propylene and about 0.1 to about 20 percent, by weight, of the different α-monoolefinic hydrocarbons in polymerized form. The amounts of each of the components can be varied within these ranges to produce copolymers having specific desirable properties. In general, such propylene polyallomers will exhibit molecular weights (Staudinger) of at least 10,000 and preferably molecular weights in the range of about 15,000 to about 270,000. The molecular weights of these polyallomers can be readily determined from their inherent viscosity in Tetralin at 145° C. using the Staudinger equation. Thus the inherent viscosities of these polyallomers in Tetralin at 145° C. are at least 0.40 to 4.5 and preferably in the range of about 0.55 to about 2.4. Thus, with inherent viscosities up to about 2.4, the polyallomers have good flow properties and can be molded without degradation. In contrast, crystalline polymers having inherent viscosities in excess of 2.4 cannot be molded under ordinary conditions without degradation which detrimentally affects their physical properties. In addition these polyallomers exhibit densities (ASTM D1505–57T) of at least 0.85, with densities in the range of about 0.87 to about 0.92 being preferred, and brittle points of less than 0° C. Such polyallomers are readily distinguishable from prior art crystalline polymers by infrared analysis. For example, propylene-ethylene polyallomers exhibit an infrared absorbance at 9.6 microns and another in the range of about 13 to about 14 microns. No other crystalline polymer heretofore available will exhibit this combination of absorbance bands.

As will hereinafter become apparent, the polyallomers may be prepared according to one embodiment by polymerization procedures wherein the first monomer system is polymerized in a first polymerization stage, and the product thereof is contacted with at least one monomer in a second polymerization stage, wherein the first monomer system may or may not be present in substantial amounts. For example, the polyallomers may be prepared in a two or more stage polymerization procedure employing a solid stereospecific polymerization catalyst comprising initially polymerizing a polymerizable monomer such as propylene and then polymerizing at least one different polymerizable monomer, for example, an α-monoolefinic hydrocarbon such as ethylene, in the presence of the polymer chain of the first monomer.

Thus certain novel copolymers of this invention are produced in a two-stage polymerization procedure in which propylene is contacted with a solid stereospecific polymerization catalyst in the first stage and the second monomer is then added to the second stage to produce a block copolymer containing at least 80% propylene and having a brittle point lower than 0° C. Further, for example, propylene or other α-monoolefinic hydrocarbon is contacted with a solid stereospecific polymerization catalyst to form a crystalline polymer chain and the second monomer is then polymerized onto the preformed polymer chain in the presence of the solid stereospecific catalyst. To prepare highly valuable crystalline propylene polyallomers in which the polymer chains are segments of propylene joined to segments of other α-monoolefinic hydrocarbons the polymerization reaction is continued until the resulting polymer contains at least 80 percent. by weight, of polymerized propylene. The processes can be conducted in a single reactor having separate reaction zones preferably separated by a baffle or other separation means. However, the separate polymerization reactions forming our process can also be conducted in separate reactors arranged in series and alternatively the entire process could be carried out in an elongated tubular reactor. The polyallomers can also be produced by carrying out the first stage of the polymerization with a polymerizable monomer, for example, propylene or other α-monoolefinic hydrocarbon and either adding a second α-monoolefinic hydrocarbon after a portion of the first monomer for example, 20–30 percent thereof, has been polymerized, or by adding the second monomer after the first monomer has been substantially completely polymerized. When operating in the latter manner, unreacted monomer from the first stage can be vented and the reactor purged with nitrogen or other inert gas before feeding the other monomer. However, in preparing certain preferred propylene-ethylene polyallomers it is preferred that a mixture of monomers be present in at least one of the polymerization stages. The exact amount of monomer feed after the first stage of the reaction is subject to wide variation depending upon such variables as the reaction conditions employed, the percent of monomer converted in the first stage, the desired molecular weight of the resulting polyallomer and similar factors. Consequently the amount of monomer fed in a specific situation will depend upon the correlation of the several variable factors. However, in the case of the preferred propylene polyallomers this amount of monomer will be such that the resulting polyallomer contains at least 0.1 percent, by weight, of an α-monoolefinic hydrocarbon other than propylene, in polymerized form, and preferably at least 80 percent, by weight, of propylene, in polymerized form.

In a particularly preferred embodiment, the propylene-ethylene polyallomer is prepared by employing three reactors in series in a solution, high temperature process. Propylene is introduced continuously to the first reactor and polymerized continuously to a conversion of between about 20–30%. The reaction system of the first reactor is fed continuously to the second reactor wherein ethylene is continuously fed and the polymerization continuously maintained. The reaction system of the second reactor is continuously fed to the third reactor wherein propylene is fed and the polymerization continuously maintained to react the ethylene essentially completely. The product is continuously withdrawn from the the third reactor and excess propylene monomer separated therefrom and recycled, if desired, after purification back to the first reactor.

The solid stereospecfiic polymerization catalysts that are employed in practicing this invention are an important feature of the process and include any of the conventional solid stereospecific catalysts known in the prior art. These catalysts contain at least two components, that is, they are initially mixtures of at least two components, one component being, namely, a halide of a transition element from the fourth to the sixth subgroups of the Periodic Table and the activator component is a metal of Group I–A or II or aluminum, or an alloy of metals of Group I–A and/or II and/or aluminum, or a halide or organometallic compound of a metal of Group I–A or II and/or aluminum, or a complex hydride or a complex organometallic compound of boron or aluminum and a metal of Group I–A or II of the Periodic Table found in "Langes Handbook of Chemistry," 8th ed. (1952), published by Handbook Publishers, Inc. at pp. 56 and 57, for example.

The transition metals included in Groups IV–B through VI–B of the Periodic Table are exemplified by metals such as titanium, zirconium, vanadium, molybdenum, chromium and the like. The transition metal halide catalyst components can be used at their maximum valence, or if desired, a reduced valency form of the halide can be employed. It is preferred to use the titanium chlorides which can be in the form of titanium tetrachloride, titanium trichloride or titanium dichloride. For maximum production of crystalline polymer alpha or gamma titanium trichloride is preferred particularly where a mixture of monomers is employed in one of the polymerization stages. Examples of other transition metal halides that can be employed in the process of this invention include titanium tetrabromide, titanium tribromide, zirconium tetrachloride, zirconium tetrabromide, vanadium trichloride, molybdenum pentachloride, chromium trichloride and the like.

Suitable activator components which can be employed in conjunction with the transition element halides to form an effective solid, stereospecific polymerization catalyst include, for example, metal alkyls, metal alkyl halides and metal hydrides of aluminum or Groups I–A and II as well as the metals alone. The preferred activator component is a lithium compound, as exemplified by lithium metal, lithium alkyl, lithium aluminum hydride, lithium aluminum alkyls, lithium borohydride and lithium aluminum compounds having the formula:

$$LiAlH_xR_y$$

wherein $x$ and $y$ are integers from 0 to 4, the sum of $x$ and $y$ is 4 and R is a hydrocarbon radical. The lithium aluminum hydride may be prepared by the process of U.S. Pats. 2,567,972 and 2,576,311. Suitable Group I–A or II metals include sodium, potassium, lithium, zinc and the like. The alloys, halides, hydrides or organometallic compounds of these metals which can be employed include, for example, sodium amyl, potassium butyl, lithium propyl, zinc dibutyl, zinc diamyl, zinc dipropyl, ethyl magnesium bromide, lithium aluminum hydride and the like. Also, the catalyst composition can contain an organo aluminum compound such as aluminum triethyl, aluminum tributyl, ethyl aluminu dichloride, cyclohexyl aluminum dichloride, cyclobutyl aluminum dichloride, ethyl aluminum dibromide, ethyl aluminum sesquichloride, ethyl aluminum sesquibromide, dimethyl aluminum bromide, propyl aluminumdichloride, dibutyl aluminum chloride, diethyl aluminum chloride and the ike. If desired, a third component can be empoyed in order to increase the stereospecificity of the catalyst and reduce the formation of waxes, oils and amorphous polymers. Suitable third components include the halides of alkali metals, magnesium oxide, aromatic ethers, for example, diphenyl ether, hydrides of sodium, potassium and lithium and alcoholates of sodium, potassium, lithium, calcium, magnesium, barium, strontium, aluminum, titanium and zirconium. In addition, it is often desirable to employ tertiary amines and tertiary phosphoramides as third components with alkyl aluminum halides.

Catalysts employing lithium, lithium alkyls, and lithium aluminum hydride, in combination with the reduced valency form of the transition elements from the fourth through the sixth group of the Periodic Table are preferred for high temperature solution or melt polymerization procedures. These catalysts are particularly effective at temperatures above 120° C.

Generally, a mole ratio of activator component to metal halide of 0.1:1 to 12:1 is satisfactory in the practice of the process; however, ratios of 0.1:1 to 2:1 are most preferred for excellent rates and yields. Where a third component is employed, the mole ratios of metal halide to third component of 0.25:1 to about 1:1 are generally satisfactory. The concentration of the catalyst in the reaction medium can be varied over a wide range. For example, catalyst concentrations of 0.1 percent or less, up to 3 percent or more can be used.

The temperature of the polymerization processes and variations thereof as disclosed herein including the two stage can be widely varied. However, temperatures ranging from about 0° C. to about 300° C. can generally be employed. The particular catalyst employed determining the most effective temperature to be used. When solid, stereospecific catalysts containing activator components other than lithium and lithium compounds are employed, temperatures of 100° C. or less are generally desirable. In slurry polymerizations at temperatures below 100° C., the inherent viscosities of polymer can be controlled by the use of a chain terminating agent, for example, hydrogen. In melt or solution polymerization at temperatures above 100° C., and preferably above 150° C., the inherent viscosity is easily controlled by rigid control of the reaction temperature and to a lesser extent by controlling pressure. However, it is also possible in melt or solution polymerization to control the inherent viscosity by using hydrogen. Where hydrogen is employed, amounts up to 10 percent, by weight, based on the weight of the polymerizable monomer, can be used. However, amounts in the range of about 500 p.p.m. to about 2 percent, by weight, based on the amount of monomer charged to the polymerization reactor generally give good results. Amounts of hydrogen in the range of about 10–500 p.p.m. can be used in melt or solution polymerization, but in general, these amounts have little effect on the molecular weight of the polyallomer, although they do improve certain physical properties, e.s., low temperature impact, without sacrificing other valuable properties, e.g., stiffness and tensile strength.

A suitable pressure range for the processes of this invention in preparing polyallomers includes, pressures from atmospheric to pressures of about 2000 atmospheres or more. Generally, it is desirable to use pressures in excess of 15 atmospheres in order to obtain satisfactory rates of reaction. Elevated pressures for example, 2 to 1500 atmospheres are often required for polymerization reactions run in the absence of a solvent.

The organic vehicles or solvents that can be employed as reaction media in the process of this invention include aliphatic alkanes or cycloalkanes such as propane, pentane, hexane, heptane, cyclohexane and the like, or hydrogenated aromatic compounds such as tetrahydronaphthalene or dechaydronaphthalene or a high molecular weight liquid paraffin or mixture or paraffins, which are liquid at the reaction temperature or an aromatic hydrocarbon such as benzene, toluene, xylene and the like. The nature of the vehicle or solvent is subject to considerable variation but the solvent should be in liquid form at the reaction conditions and relatively inert to the reactants and reaction products. Other solvents that can be employed with good results include ethyl benzene, isopropyl benzene, ethyl toluene, n-propyl benzene, the diethy benzenes, mono and dialkyl naphthalenes, n-pentane, octane, isooctane, methyl cyclohexane, mineral spirits and any of the other well known inert hydrocarbons.

In forming the propylene type polyallomers, the α-monoolefinic hydrocarbons used to prepare the minor portion of the polyallomer are readily polymerizable α-monoolefinic hydrocarbons, and preferably the α-monoolefinic hydrocarbons containing 2 to 10 carbon atoms, as exemplified by ethylene, butene-1, pentene-1, 3-methylbutene-1, 4-methylpenten-1, 4-methylhexene-1, 5-methylhexene-1, 4,4-dimethylpentene-1, hexene-1, heptene-1, decene-1, styrene, vinyl cyclohexane and the like. The weight percent polymerized α-monoolefinic hydrocarbon contained in the propylene-α-monoolefinic hydrocarbon polyallomers is readily determinable on a solid sample, i.e. a thin film by infrared analysis.

This invention can be further illustrated by the following examples of preferred and other embodiments thereof although it will be understood that these examples are included merely for purposes of illustration and are not intended to limit the scope of the invention unless otherwise specifically indicated.

EXAMPLE 1

0.60 grams of $LiAlH_4$ (0.0158 mole) and 2.46 grams of $TiCl_3$ (0.0158 mole) slurried in 900 ml. of mineral spirits are charged to a 2-liter stirred autoclave. The polymerization is carried out as follows:

| Time | Pressure | Temp., ° C. |
| --- | --- | --- |
| 3:50 | (1) | 133 |
| 4:05 | 1,775 | 161 |
| 4:18 | 1,050 | 164 |
| 4:25 | 900 | 159 |
| 4:50 | 600 | |
| 4:52 | (2) | 155 |
| 5:30 | 515 | 154 |
| 7:00 | 185 | 151 |

1 800 p.s.i.g. $C_3H_6$.
2 Pressured to 850 p.s.i.g. with $C_2H_4$.

The autoclave is cooled and the polymer washed free of catalyst with hot isobutanol to yield 320 grams of gross polymer containing 85 percent hexane-insoluble propylene polyallomer. The propylene polyallomer contains 95 percent by weight of polymerized propylene and 5 percent by weight of polymerized ethylene. The gross polymer exhibits a melt index of 3.6, an inherent viscosity at 145° C. in Tetralin of 1.36, a Vicat softening point of 131° C. and a brittleness temperature of −50° C. This compares with a brittleness temperature of >20° C. for 100 percent polypropylene.

Upon extraction with boiling hexane 15 percent of the gross polymer is removed and the crystalline propylene polyallomer is obtained. The crystalline polyallomer has an inherent viscosity at 145° C. in Tetralin of 1.55, a Vicat softening point of 139° C., and a characteristic infrared absorption maxima at 9.6 and 13.9 microns.

EXAMPLE 2

0.75 gram of $LiAlH_4$ (0.02 mole) and 3.06 grams of $TiCl_3$ (0.02 mole) in 900 ml. of mineral spirits are charged to a 2-liter stirred autoclave. The polymerization is carried out as follows:

| Time | Pressure | Temp., °C. |
|---|---|---|
| 2:45 | (1) | 132 |
| 2:55 | 1,700 | 150 |
| 3:35 | 2 550 | |
| 3:45 | 500 | 170 |
| 4:10 | 410 | 165 |
| 4:30 | 375 | 160 |

1 800 p.s.i.g. $C_3H_6$.
2 Pressured to 800 p.s.i.g. with butene-1.

The autoclave is discharged through a filter yielding 400 grams of gross polymer containing a hexane-insoluble propylene-butene-1 polyallomer containing 96 percent, by weight, polymerized propylene and 4 percent, by weight, of polymerized butene-1. The gross polymer has a brittleness temperature of −35° C. Extraction with refluxing hexane for 10 hours removes 10 percent of the gross polymer leaving the crystalline propylene-butene-1 polyallomer which exhibits a brittleness temperature of −21° C. and an infrared absorption maxima at 9.6 and 13.1 microns.

EXAMPLE 3

Propylene-ethlene polyallomer is prepared by polymerization in a continuous 2-stage reactor system. In the first stirred tubular reactor the feed is liquid propylene and the catalyst is ethyl aluminum sesquichloride, hexamethyl phosphoramide and titanium trichloride in a 2/1/3 molar ratio. The catalyst, suspended in xylene, is fed to the liquid propylene and the polymerization is carried out at 80° C. and 770 p.s.i.g. using 100 p.p.m. $H_2$ to control inherent viscosity. Conversion in the first stage averages 25–30 percent at a catalyst concentration of 0.2 percent.

The polymer slurry from the first stage is fed to the second stage tubular reactor, 4 weight percent ethylene is added, and the polymerization continued at 80° C. and 860 p.s.i.g.

From the second stage the polymer slurry in liquid propylene is let down to a solids-gas separator. The olefins are flashed off and sent to a separation unit. The polymer dropped to a wash tank and the catalyst removal is effected with hot isobutanol washing.

The propylene-ethylene polyallomer containing 97 percent, by weight, of polymerized propylene and 3 percent, by weight, of polymerized ethylene in a yield per unit of catalyst of 250 is obtained. The inherent viscosity of the propylene-ethylene polyallomer is 2.2, the brittleness temperature is −28° C. and the infrared spectrum shows absorption maxima at 9.6 and 13.9 microns.

EXAMPLE 4

Five additional runs are made in preparing propylene polyallomers in which three different alpha-olefinic hydrocarbons are employed to form the minor portion of the block copolmer chain. The procedural aspects, together with the results of these runs are set forth in the following table. The gross polymer was hexane-extracted for 12 hours at 69° C. in each case. The infrared spectrum for Run 4 in the following table shows the absorption maxima at 9.6 and 13.8 microns.

TABLE 1

| Catalyst components | Mole ratio of components | Polymerization conditions | | | Alpha-olefinic Hydrocarbon comonomer fed to second stage | Wt. percent of α-olefinic hydrocarbon comonomer in polymer | Brittleness temperature, °C. |
|---|---|---|---|---|---|---|---|
| | | Solvent | Temp., °C. | Pressure, p.s.i.g. | | | |
| Li, TiCl₃, Diphenyl ether | 5/1/1 | Cyclohexane | 160 | 1,000 | Ethylene | 5 | −50 |
| Et₃Al₂Cl₃, TiCl₃, H₂O | 1/1/1 | Mineral spirits | 80 | 700 | do | 3 | −26 |
| Et₃Al, VCl₃, NaF | 2/1/1 | Liquid C₃H₆ | 85 | 770 | Butene-1 | 7 | −15 |
| Et₃Al, TiCl₃, Al(OPr)₃ | 2/1/0.5 | Cyclohexane | 85 | 400 | Hexene-1 | 2 | −22 |
| LiAlH₄, TiCl₃, LiH | 0.1/1/4.9 | Mineral spirits | 160 | 1,200 | Ethylene | 10 | −53 |

EXAMPLE 5

As previously indicated, propylene-ethylene polyallomers with superior low temperature properties are produced by carrying out the polymerization in a 2-zone stirred reactor at elevated pressures and temperatures. To illustrate this feature of the invention, an elongated reactor 14 feet long and 20 inches internal diameter separated into two distinct reaction zones by a centrally located baffle and having a stirring mechanism extending through the two reaction zones is used in the following runs. In the top zone, the agitator shaft that extends through the center of the reactor is provided with a single 4-bladed paddle type agitator at the top of the zone. This type of agitator arrangement is used to obtain the maximum amount of reaction in the first zone with a minimum amount of catalyst. In the second or lower zone mixing paddles are placed substantially along the entire length of the agitator shaft to give a plug flow with a minimum of back mixing from the second to the first zone.

Propylene is compressed to 1250–1500 atmospheres and fed into the top zone at rates varying from 8600 to 14,100 pounds per hour. A catalyst of 3.2 parts by weight of lithium metal dispersion, 0.17 part by weight lithium aluminum hydride and 14.3 parts by weight of titanium trichloride, slurried in cyclohexane, is fed at rates varying from 0.2 to 0.45 pound per hour. The temperature in the first zone is controlled by external cooling and by controlling the rate of feed and temperature of the incoming propylene. Conversions in the first zone are controlled at 20–40 percent by controlling the propylene feed rate and the catalyst concentration employed.

In the second zone ethylene is fed to give propylene-ethylene polyallomers with superior low temperature brittleness values. Feed rates for ethylene varying from 100 to 1000 pounds per hour are typical of those employed in the practice of this process.

The results of four runs using the procedure described hereinabove are set forth in the following table.

TABLE 2

| | Run Number | | | |
|---|---|---|---|---|
| | 1 | 2 | 3 | 4 |
| Propylene feed to first zone, lb./hr | 10,800 | 12,100 | 8,900 | 7,300 |
| 3.2 Li, 0.17 LiAlH$_4$, 14.3 TiCl$_3$ cat. feed lb./hr | 0.23 | 0.46 | 0.31 | 0.41 |
| Reactor pressure, atm | 1,270 | 1,300 | 1,250 | 1,500 |
| Reactor temperatures, ° C.: | | | | |
| First zone top | 170 | 168 | 174 | 178 |
| First zone bottom | 190 | 193 | 191 | 193 |
| Second zone top | 190 | 192 | 196 | 199 |
| Second zone bottom | 186 | 190 | 199 | 206 |
| Ethylene feed to second zone, lb./hr | 230 | 380 | 360 | 310 |
| Production rate, lb./hr | 3,360 | 4,020 | 2,170 | 2,420 |
| Inherent viscosity (Tetralin, 145° C.) | 2.57 | 2.31 | 2.42 | 2.68 |
| Percent ethylene in polyallomer | 2.1 | 3.9 | 7.0 | 9.0 |
| Brittleness temperature, ° C | −25 | −41 | <−60 | <−60 |

The infrared spectrum for each of these polyallomers shows absorption maxima at 9.6 and 13.9 microns.

EXAMPLE 6

Aluminum triethyl (5.0 ml.) and titanium tetrachloride (2.4 ml.) are added to 500 ml. of heptane contained in a 1-liter 3-neck flask under a nitrogen atmosphere. The flask is fitted with a gas inlet tube which reaches to the bottom of the flask, a mechanical stirrer, and a brine-cooled reflux condenser. A gas outlet leads from the top of the condenser through a mercury bubbler and finally to an ice trap maintained at −10 to −20° C. The mercury bubbler serves to exclude air from the reaction vessel and the ice trap is used to determine the amount of solvent swept through the condenser with effluent monomer gas.

The catalyst mixture is stirred and propylene is introduced through the inlet tube at such a rate that little escapes through the mercury bubbler. After two hours, 29 grams of propylene is absorbed. The introduction of propylene is stopped and ethylene is introduced for two hours. Cooling is employed during this stage to keep the reaction temperature at or below 60° C.

Methanol (200 ml.) is added to decompose the catalyst and the solid ethylene-propylene polyallomer is recovered by filtration. The solid is washed free of catalyst with hot methanolic hydrochloric acid and methanol. The gross polymer contains 9 percent hexane extractables, weighs 80 grams and melts at 139–154° C. The properties of the gross polymer are: melt index 0.28, high pressure melt index 0.44, density 0.937, tensile strength at fracture 2455 p.s.i., at upper yield 2175 p.s.i., percent elongation 575, stiffness in flexure 38,600 p.s.i., Vicat softening point 118.2° C. and a brittleness point below −70° C. After hexane extraction of the gross polymer the crystalline ethylene-propylene polyallomer containing 68 percent by weight of polymerized ethylene and 32 percent by weight of polymerized propylene exhibits a melt index of 0.024, a density of 0.940, a tensile strength at fracture of 4600 p.s.i., at upper yield 4350 p.s.i., an elongation of 450 percent, a stiffness of 56,000 p.s.i., a Vicat softening point of 127° C., a brittleness point of −60° C. and an infrared spectrum showing absorption maxima at 9.6 and 13.9 microns.

EXAMPLE 7

A mixture of 500 ml. of heptane, 10.0 ml. of ethyl aluminum sesquibromide and 10.0 ml. of titanium tetrachloride is prepared in a 1-liter 3-neck flask. The flask is fitted for propylene polymerization as described in Example 6. The catalyst mixture is prepared in a nitrogen atmosphere as in Example 6.

The reaction mixture is stirred and propylene is introduced beneath the surface of the liquid. The mixture warms spontaneously to 50–60° C. and the rate of propylene flow is adjusted so that the temperature of the reaction mixture remains between 50 and 60° C. After four hours the weight of propylene absorbed is 28 grams.

Introduction of propylene is stopped and ethylene is introduced for three hours. Occasional cooling is necessary to keep the temperature of the reaction mixture between 50 and 60° C.

The gross polymr is recovered by filtration and washed free of catalyst with methanolic hydrochloric acid and methanol. This polymer weighs 66 grams and melts at 132–145° C. Properties of the polymer are: high pressure melt index, 2.86; specific gravity, 0.901; tensile strength at fracture, 2280 p.s.i.; at upper yield, 2280 p.s.i.; stiffness in flexure, 33,800 p.s.i.; Vicat softening point, 105.4° C.; and a brittleness point of <−70° C.

Extraction of the gross polymer with boiling hexane removes 8 percent of the gross polymer to give the crystalline propylene-ethylene polyallomer. This propylene-ethylene polyallomer has a specific gravity of 0.915, a tensile strength at fracture of 2750 p.s.i., at upper yield 2990 p.s.i., an elongation of 550 percent, a stiffness in flexure of 65,000 p.s.i., a Vicat softening point of 122° C. a brittleness point of −60° C., and an infrared spectrum which shows absorption maxima at 9.6 and 13.9 microns.

EXAMPLE 8

As already indicated, the propylene polyallomers in which the minor portions are segments comprising less than 1 percent, by weight, of a different alpha-monoolefinic hydrocarbon in polymerized form, exhibit wholly unexpected low temperature brittleness properties. To illustrate, six runs are made using the following procedure.

The aforementioned propylene polyallomers are prepared by high temperature solution polymerization in a continuous two-stage reactor system. In the first stirred tubular reactor the feed is mineral spirits, propylene and catalyst slurry. The catalyst slurry is a suspension of lithium metal, lithium aluminum hydride, titanium trichloride and sodium fluoride in a mole ratio of 2/0.5/1/1 for Runs 1–3. In Runs 4–6 the catalyst consists of a slurry in mineral spirits of lithium aluminum hydride, titanium trichloride and sodium fluoride at a mole ratio of 1/1/1. The first reactor is maintained at 160° C. 1000 p.s.i.g. and feed rates are adjusted to give a solids content in the reactor of 20 to 30 percent. The effluent from the first reactor is fed to the second stage stirred tubular reactor which is also operated at 1000 p.s.i.g. and 160° C. Ethylene gas is fed to the second reactor at a rate such that less than 1 percent ethylene is added to the chains in the polymer. Conversion of this ethylene is essentially 100 percent.

From the second stage reactor the polymer solution is let down to a dilution tank where unreacted propylene is flashed off and fresh mineral spirits is added to yield a solution containing 10 percent solids. The diluted solution is filtered to remove catalyst and the clarified solution is freed of solvent by stripping with hot propylene at 200° C. The solvent free polymer is extruded into strands and chopped into pellets. The pellets are extracted with hexane at 69° C. for 12 hours to remove amorphous polymer and then dried with inert gas. Ethylene content of the various propylene polyallomers is determined by measuring the intensity of the absorption in the region of 13.9 microns in the infrared spectrum. These propylene-ethylene polyallomers also exhibit their characteristic absorption in the region of 9.6 microns. The properties of the polymers and the weight percent of ethylene in polymerized form, present in the polymers are set forth in Table 3 which follows.

TABLE 3

|  | Run No. | | | | | |
| --- | --- | --- | --- | --- | --- | --- |
|  | 1 | 2 | 3 | 4 | 5 | 6 |
| Weight percent ethylene | 0.2 | 0.1 | 0.7 | 0.3 | 0.5 | 0.8 |
| Flow rate at 230° C. using a 2,160 g. load; melt index (ASTM D1238) | 1.78 | 2.10 | 1.89 | 5.62 | 10.4 | 8.76 |
| Density (ASTM D1505-57T) | 0.9102 | 0.9109 | 0.9105 | 0.9095 | 0.9100 | 0.9097 |
| Brittleness temperature, ° C | −12 | −14 | −16 | −12 | −13 | −14 |
| Inherent viscosity in Tetralin, 0.25 conc. at 145° C | 1.92 | 1.85 | 1.90 | 1.55 | 1.40 | 1.45 |
| Tensile strength, 2 in./min. at yield, p.s.i | 4,050 | 3,980 | 3,900 | 4,330 | 4,230 | 4,070 |
| Stiffness in flexure, p.s.i | 122,000 | 118,000 | 114,000 | 128,000 | 123,000 | 117,000 |
| Hardness, Rockwell R scale | 82 | 79 | 74 | 91 | 89 | 86 |
| Tensile impact strength, p.s.i. (ASTM D1822-61T) | 64 | 67 | 77 | 74 | 76 | 71 |
| Izod impact strength at 23° C. (ASTM D256-54T): | | | | | | |
| Notched | 0.75 | 0.82 | 0.92 | 0.40 | 0.42 | 0.45 |
| Unnotched | (1) | (1) | (1) | (1) | (1) | (1) |

[1] No break.

EXAMPLE 9

As already indicated, the polymerization reaction can be initiated with an α-monoolefinic hydrocarbon other than propylene, for example, ethylene and terminated with propylene. To illustrate, a 2-liter flask containing a catalyst mixture of 7.5 ml. of aluminum triethyl and 3.6 ml. of titanium tetrachloride in 750 ml. of heptane is fitted for polymerization as described in Example 6. The catalyst mixture is stirred and ethylene is introduced until 29 grams has been absorbed. The olefin feed is then switched to propylene and introduction of propylene is continued for five hours. The polymer is recovered by filtration and washed free of catalyst with 10 percent hydrochloric acid in methanol solution, hot 1 percent sodium hydroxide in methanol solution and pure methanol. The yield of colorless gross polymer is 135 grams and contains about 11 percent hexane extractables. The gross polymer has a melt index of 1.69, a specific gravity of 0.891, a tensile strength at fracture of 1405 p.s.i., at upper yield 1405 p.s.i., a percent elongation of 150 percent, a stiffness in flexure of 20,700, a Vicat softening point of 83–84° C. and a brittleness point of −50° C.

Extraction of the gross polymer with refluxing normal hexane for 18 hours removes the 11 percent hexane extractables and yields a crystalline propylene-ethylene polyallomer. This propylene-ethylene polyallomer shows absorption bands at 9.6 and 13.6 microns in the infrared and has a melt index of 0.8, a specific gravity of 0.901, a tensile strength at fracture of 2550 p.s.i., at upper yield 335 p.s.i., an elongation of 600 percent, a stiffness in flexure of 89,000 p.s.i., Vicat softening point of 128° C. and a brittlenes point of −42° C.

EXAMPLE 10

As previously indicated, polyallomers exhibiting a unique combination of properties can be prepared by polymerizing segments of a 2–3 carbon atom α-monoolefin onto preformed segments of a different α-monoolefinic hydrocarbon containing 2–3 carbon atoms using a solid stereospecific polymerization catalyst. To illustrate, three runs are made as follows:

An 82-gal. stirred autoclave is purged with propylene and charged with 40 gal. of mineral spirits. 20 g. of lithium aluminum hydride, 22 g. of sodium fluoride and 80 g. of titanium trichloride are charged to the reactor and propylene is added to bring the pressure to 100 p.s.i.g. The vessel is heated to 150° C. and propylene is fed to bring the pressure up to 450 p.s.i.g. After 6 hours at 450 p.s.i.g. and 150° C., unreacted propylene is vented and the vessel is repressured to 50 p.s.i.g. with dry nitrogen. The stirrer is operated for 10 minutes and the vessel is vented to atmospheric pressure. This process is repeated until the vessel has been pressured with nitrogen a total of three times. Ethylene gas is added to a pressure of 50 p.s.i.g. and polymerization is continued until the desired ethylene content is reached.

The polymer solution is concentrated and solid polymer extruded into strands which are chopped into pellets. The pellets are extracted with hexane for 12 hours at 60° C.

The infrared spectrum for each of the runs shows the characteristic absorption maxima at 9.6 and between 13 and 14 microns. The yields obtained in each of the runs together with the physical properties of the polyallomers are set forth in the following table.

TABLE 4

|  | Run Number | | |
| --- | --- | --- | --- |
|  | 1 | 2 | 3 |
| Weight percent ethylene | 0.7 | 4.1 | 2.1 |
| Flow rate at 230° C. using a 2,160 g. load; (ASTM D1238) | 2.5 | 2.2 | 2.7 |
| Density (ASTM D1505-57T) | 0.9086 | 0.8980 | 0.9038 |
| Brittleness temperature, ° C | −7 | −40 | −24 |
| Inherent viscosity in Tetralin, 0.25 conc. at 145° C | 1.78 | 1.81 | 1.73 |
| Tensile strength, 2 in./min., at yield, p.s.i | 3,950 | 2,780 | 3,42 |
| Stiffness in flexure, p.s.i | 103,000 | 55,000 | 87,000 |
| Hardness, Rockwell R scale | 84 | 48 | 66 |
| Tensile impact strength, p.s.i. (ASTM D1822-61T) | 60 | 125 | 87 |
| Izod impact strength at 23° C. (ASTM D256-54T): | | | |
| Notched | 1.1 | 10.5 | 2.6 |
| Unnotched | (1) | (1) | (1) |
| Crystallinity of gross polymer | 85 | 80 | 82 |
| Yield, lb | 102 | 110 | 96 |

[1] Twist.

EXAMPLE 11

The polyallomers comprising less than 1%, by weight, of polymerized ethylene exhibit wholly unexpected low temperatures brittleness properties. To illustrate, three runs are made using the following procedure.

Polyallomers having low polymerized ethylene content are readily prepared by high temperature solution polymerization in a continuous two-stage reactor system. The synthesis section of the reactor consists of two tubular reactors operated in series, each reactor having a volume of 800 gal. Propylene and a catalyst consisting of one part, by weight, of lithium aluminum hydride, 4 parts, by weight, of titanium trichloride and 1.1 parts, by weight, of sodium fluoride in 60 parts, by weight, mineral spirits are charged to the first reactor. Effluent from the first reactor is fed to the second reactor where ethylene is added at the rate required to produce the desired polyallomer. The reactor conditions for these runs are as follows:

TABLE 5

|  | Run No. | | |
| --- | --- | --- | --- |
|  | 1 | 2 | 3 |
| Catalyst feed, lb./hr | 0.11 | 0.18 | 0.20 |
| Temperature, ° C.: | | | |
| First reactor | 155 | 163 | 151 |
| Second reactor | 166 | 162 | 160 |
| Reactor pressure, p.s.i.g.: | | | |
| First reactor | 1,000 | 1,000 | 1,000 |
| Second reactor | 1,000 | 1,000 | 1,000 |
| Solids content, wt. percent: | | | |
| First reactor | 31 | 33 | 35 |
| Second reactor | 35 | 33 | 36 |
| Ethylene feed, lb./hr.: | | | |
| First reactor | 0 | 0 | 0 |
| Second reactor | 1.2 | 0.35 | 0.7 |
| Polyallomer produced, lb./day | 3,890 | 1,498 | 2,820 |

From the second reactor the solution is concentrated and the polymer extruded into strands, cooled in a water bath and chopped into pellets. The pellets are extracted with hexane at 65–69° C. for 12 hours and dried. Eethylene content is easily determined on a solid sample, i.e., a thin film using infrared analysis. The polyallomers produced according to the above procedures have the following properties.

TABLE 6

| | Run No. | | |
|---|---|---|---|
| | 1 | 2 | 3 |
| Weight percent ethylene | 0.66 | 0.46 | 0.55 |
| Flow rate at 230° C. using a 2,160 g. load; (ASTM D1238) | 8.96 | 2.03 | 2.57 |
| Density (ASTM D1505–57T) | 0.9077 | 0.9084 | 0.9115 |
| Brittleness temperature, ° C. | −3 | −4 | −6 |
| Inherent viscosity in Tetralin, 0.25 conc. at 145° C. | 1.58 | 1.93 | 1.92 |
| Tensile strength, 2 in./min., at yield, p.s.i. | 3,880 | 3,960 | 4,560 |
| Stiffness in flexure, p.s.i. | 105,400 | 123,300 | 138,000 |
| Hardness, Rockwell R scale | 90 | 92 | 89 |
| Tensile impact strength, p.s.i. (ASTM D1822–61T) | 65 | 70 | 64 |
| Izod impact strength at 23° C. (ASTM D256–54T): | | | |
| Notched | 1 0.53 | 0.91 | 0.58 |
| Unnotched | (1) | (1) | (1) |
| Ash content, wt. percent | 0.007 | 0.003 | 0.002 |

1 Twist.

EXAMPLE 12

The procedure of Example 11 is repeated using a catalyst comprising 0.35 part, by weight, lithium metal, 0.5 part, by weight, lithium aluminum hydride, 4 parts, by weight, titanium trichloride and 1.1 parts, by weight, sodium fluoride in 60 parts, by weight, mineral spirits and the following reaction conditions:

TABLE 7

| | Run No. | | |
|---|---|---|---|
| | 1 | 2 | 3 |
| Catalyst feed, lb./hr | 0.25 | 0.20 | 0.25 |
| Temperature, ° C.: | | | |
| First reactor | 165 | 163 | 166 |
| Second reactor | 171 | 168 | 174 |
| Reactor pressure, p.s.i.g.: | | | |
| First reactor | 1,000 | 1,000 | 1,000 |
| Second reactor | 1,000 | 1,000 | 1,000 |
| Solids content, wt. percent: | | | |
| First reactor | 28 | 32 | 33 |
| Second reactor | 31 | 33 | 35 |
| Ethylene feed, lb./hr.: | | | |
| First reactor | 0 | 0 | 0 |
| Second reactor | 2.0 | 2.5 | 3.0 |
| Polyallomer produced, lb./day | 3,200 | 2,935 | 2,875 |

The polyallomers produced show the characteristic infrared absorption maxima at 9.6 and between 13 and 14 microns and have the following properties:

TABLE 8

| | Run No. | | |
|---|---|---|---|
| | 1 | 2 | 3 |
| Weight percent ethylene | 1.50 | 1.93 | 2.37 |
| Flow rate at 230° C. using a 2,160 g. load; (ASTM D1238) | 2.85 | 3.35 | 1.73 |
| Density (ASTM D1505–57T) | 0.9067 | 0.9040 | 0.9048 |
| Brittleness temperature, ° C. | −12 | −16 | −22 |
| Inherent viscosity in Tetralin, 0.25 conc. at 145° C. | 1.79 | 1.72 | 1.86 |
| Tensile strength, 2 in./min., at yield, p.s.i. | 3,720 | 3,470 | 3,520 |
| Stiffness in flexure, p.s.i. | 96,200 | 94,100 | 89,100 |
| Hardness, Rockwell R scale | 74 | 72 | 69 |
| Tensile impact strength, p.s.i. (ASTM D1822–61T) | 77 | 90 | 110 |
| Izod impact strength at 23° C. (ASTM D256–54T): | | | |
| Notched | 0.83 | 0.75 | 1.47 |
| Unnotched | (1) | (1) | (1) |
| Ash content, wt. percent | 0.001 | 0.002 | 0.001 |

1 Twist.

EXAMPLE 13

Polyallomers are preferably prepared by initially polymerizing propylene followed by ethylene polymerization. However, ethylene can be initially polymerized with subsequent polymerization of the propylene. An 82-gal. reactor is charged with 40 gal. of mineral spirits containing a catalyst charge of 20 g. lithium aluminum hydride, 22 g. sodium fluoride and 80 g. titanium trichloride. Ethylene is polymerized at 50 p.s.i.g. for 20 minutes and the reactor is vented to atmospheric pressure. Propylene is pumped in to a pressure of 450 p.s.i.g. and polymerized at 150° C. for 6 hours. The solution is concentrated and the polyallomer is extruded into strands, cooled, chopped into pellets and extracted with hexane for 12 hours at 65–69° C. The polyallomer exhibits absorption maxima at 9.6 and 13.9 microns and has the following properties.

TABLE 9

Properties:
| | |
|---|---|
| Weight percent ethylene | 2.2 |
| Flow rate at 230° C. using a 2160 g. load (ASTM D1238) | 2.9 |
| Density (ASTM D1505–57T) | 0.9029 |
| Brittleness temperature, ° C. | −26 |
| Inherent viscosity in Tetralin, 0.25 conc. at 145° C. | 1.69 |
| Tensile strength, 2 in./min., at yield, p.s.i. | 3440 |
| Stiffness in flexure, p.s.i. | 89,200 |
| Hardness, Rockwell R Scale | 64 |
| Tensile impact strength, p.s.i. (ASTM D1822–61T) | 80 |
| Izod impact strength at 23° C. (ASTM D256–54T)— | |
| Notched | 2.4 |
| Unnotched | Twist |
| Crystallinity of gross polymer | 86 |

EXAMPLE 14

The polyallomers most amenable to injection molding techniques are characterized by an inherent viscosity in Tetralin at 145° C. no greater than 2.4. At inherent viscosities above this level the properties of the polymer, particularly in molding applications, are seriously impaired. To illustrate:

An 82 gal. stirred autoclave is purged with propylene and charged with 40 gal. of mineral spirits and catalyst comprising 30 g. of lithium aluminum hydride, 22 g. of sodium fluoride and 80 g. of titanium trichloride. Propylene is polymerized at a pressure of 450 p.s.i.g. and 150° C. for 12 hours. Unreacted propylene is vented and ethylene gas added to a pressure of 50 p.s.i.g. The polymerization is continued at 150° C. for 30 minutes. The reactor is discharged to a mix tank containing 40 gal. of isobutanol. The polymer is washed four times with isobutanol at 100° C. The yield is 120 pounds of polymer having an inherent viscosity in Tetralin at 145° C. of 2.96.

Attempts to injection mold a sample, even at the maximum cylinder temperature of 600° F. are unsuccessful. Thus, the sample fumes excessively, discolors badly and fails to fill the mold. Hence, the processability characteristics of such a polymer make it practically useless, particularly in fiber and film applications.

In order to obtain the physical properties of the polymer prepared according to the above procedure it is necessary to compression mold samples at 190° C. for 15 minutes. The properties are as follows:

TABLE 10

| | |
|---|---|
| Weight percent ethylene | 3.4 |
| Flow rate at 230° C. using a 2160 g. load (ASTM D1238) | 0.5 |
| Density (ASTM D1505–57T) | 0.8991 |
| Brittleness temperature, ° C. | −43 |
| Inherent viscosity in Tetralin, 0.25 conc. at 145° C. | 2.96 |
| Tensile strength, 2 in./min., at yield p.s.i. | 3150 |
| Stiffness in flexure, p.s.i. | 61,400 |
| Hardness, Rockwell R Scale | 62 |
| Tensile impact strength, p.s.i. (ASTM D1822–61T) | No break. |
| Izod impact strength at 23° C. (ASTM D256–54T)— | |
| Notched | 10.5 |
| Unnotched | Twist. |

EXAMPLE 15

As previously indicated, solid, crystalline polymer containing propylene and about 0.1 to about 7%, by weight, of polymerized ethylene have a particularly unique combination of physical properties and can be prepared by the process disclosed herein. To illustrate, three runs are made as follows:

An 82 gal. stirred autoclave is purged with proplyene and charged with 40 gal. of mineral spirits and a catalyst comprising 57 g. of aluminum triethyl and 51 g. of titanium trichloride. The vessel is heated to 75° C. and propylene, with 500 p.p.m. of hydrogen, is fed to a pressure of 450 p.s.i.g. After 6 hours at 75° C., the autoclave is vented slowly to atmospheric pressure and nitrogen is introduced to 50 p.s.i.g. The stirrer is operated for 10 minutes and the vessel is vented to atmospheric pressure. This process is repeated until the vessel has been pressured with nitrogen a total of three times. Ethylene gas is added to a pressure of 50 p.s.i.g. and polymerization is continued until the desired ethylene content is reached.

The polymer slurry is heated to 160° C., filtered and concentrated. The polymer is extruded into strands, chopped into pellets and extracted with hexane for 6–12 hours at 60° C. The polymers show characteristic absorption maxima at 9.6 and between 13 and 14 microns. The yield obtained, together with the physical properties of the polymers obtained by the above procedure are as follows:

TABLE 11

| | Run No. | |
|---|---|---|
| | 1 | 2 |
| Weight percent ethylene | 0.6 | 2.0 4.43 |
| Flow rate at 230° C. using a 2160 g. load; (ASTM D1238) | 2.8 | 2.9 1.9 |
| Density (ASTM D1505–57T) | 0.9093 | 0.9044 0.8978 |
| Brittleness temperature, ° C. | −5 | −22 −42 |
| Inherent viscosity in Tetralin, 0.25 conc. at 145° C. | 1.75 | 1.71 1.85 |
| Tensile strength, 2 in./min., at yield, p.s.i. | 3,870 | 3,560 2,550 |
| Stiffness in flexure, p.s.i. | 99,500 | 92,400 49,800 |
| Hardness, Rockwell R scale | 87 | 68 51 |
| Tensile impact strength, p.s.i. (ASTM D1822–61T) | 56 | 79 122 |
| Izod impact strength at 23° C. (ASTM D256–54T): | | |
| Notched | 0.9 | 1.9 12.0 |
| Unnotched | (1) | (1) (1) |
| Crystallinity of gross polymer | 88 | 84 84 |
| Yield, lb | 95 | 112 |

[1] Twist.

EXAMPLE 16

In practicing the process of this invention, it is preferred that propylene be initially polymerized and ethylene polymerized subsequently. However, ethylene can be polymerized initially in the process. An 82-gal. stirred autoclave is charged with 40 gal. of mineral spirits and a catalyst comprising 57 g. of aluminum triethyl and 51 g. of titanium trichloride. The vessel is heated to 75° C. and ethylene is fed to a pressure of 50 p.s.i.g. After 15 minutes at 75° C., the unreacted ethylene is vented. Propylene and 500 p.p.m. hydrogen are added to a pressure of 450 p.s.i.g. The polymerization is continued for 6 hours and the polymer worked up as in Example 15. The results are as follows:

TABLE 12

| | |
|---|---|
| Weight percent ethylene | 2.3 |
| Flow rate at 230° C. using a 2160 g. load (ASTM D1238) | 2.1 |
| Density (ASTM D1505–57T) | 0.9039 |
| Brittleness temperature, ° C. | −20 |
| Inherent viscosity in Tetralin, 0.25 conc. at 145° C. | 1.78 |
| Tensile strength, 2 in./min., at yield, p.s.i. | 3,580 |
| Stiffness in flexure, p.s.i | 90,100 |
| Hardness, Rockwell R Scale | 70 |
| Tensile impact strength, p.s.i. (ASTM D1822–61T) | 76 |
| Izod impact strength at 23° C. (ASTM D256–54T)— | |
| Notched | 3.0 |
| Unnotched | Twist |
| Crystallinity of gross polymer | 89 |
| Yield, lb. | 130 |

EXAMPLE 17

In order to obtain polymers in a slurry process exhibiting the unique combination of processability and other physical properties described hereinbefore, it is necessary to control the inherent viscosity of the polymer with hydrogen so it does not exceed 2.4 in Tetralin at 145° C. If the process is not controlled in this manner a polymer having very poor physical properties, especially processability, results. To illustrate:

An 82-gal. stirred autoclave is purged with propylene and charged with 40 gal. of mineral spirits and a catalyst comprising 57 g. of aluminum triethyl and 51 g. of titanium trichloride. The vessel is heated to 75° C. and propylene is fed to a pressure of 450 p.s.i.g. After 6 hours at 75° C., the autoclave is vented slowly to atmospheric pressure and nitrogen is introduced to 50 p.s.i.g. The stirrer is operated for 10 minutes and the vessel is vented to atmospheric pressure. This process is repeated until the vessel has been pressured with nitrogen a total of three times. Ethylene gas is added to a pressure of 50 p.s.i.g. and the polymerization continued for 15 minutes. The reactor is discharged to a mix tank and the mixture washed with isobutanol at 100° C. The yield is 95 pounds of polymer having an inherent viscosity in Tetralin at 145° C. of 3.65.

Attempts to injection mold a sample, even at temperatures up to 600° F., of the polymer prepared by the above procedure are unsuccessful. Thus, the sample fumes excessively, colors a yellow-brown and will not fill the mold. Hence, the processability characteristics of such a polymer make it practically useless, particularly in applications such as fibers and films. In order to determine physical properties of this polymer it is necessary to compression mold a sample. The properties are as follows:

TABLE 13

| | |
|---|---|
| Weight percent ethylene | 2.2 |
| Flow rate at 230° C. using a 2160 g. load; melt index (ASTM D1238) | 0.06 |
| Density (ASTM D1505–57T) | 0.9030 |
| Brittleness temperature, ° C. | −32 |
| Inherent viscosity in Tetralin, 0.25 conc. at 145° C. | 3.65 |
| Tensile strength, 2 in./min., at yield, p.s.i. | 3,360 |
| Stiffness in flexure, p.s.i | 78,800 |
| Hardness, Rockwell R Scale | 64 |
| Tensile impact strength, p.s.i. (ASTM D1822–61T) | 89 |
| Izod impact strength at 23° C. (ASTM D256–54T)— | |
| Notched | 5.6 |
| Unnotched | Twist |

EXAMPLE 18

The polyallomers exhibit a unique combination of physical properties that is clearly superior to that of copolymers of propylene and ethylene or blends of crystalline polypropylene with crystalline polyethylene. Furthermore, polyallomers are readily distinguished from such copolymers and homopolymer blends on the basis of density and brittle point. To illustrate:

An 82 gal. stirred autoclave is charged with 40 gal. of mineral spirits, 20 g. of lithium aluminum hydride, 22 g. of sodium fluoride and 80 g. of titanium trichloride. A gas mixture of 98 parts propylene and 2 parts ethylene, by volume, is polymerized at 450 p.s.i.g. and 150° C. for 12 hours. The polymer solution is filtered and concentrated and the copolymer hexane extracted for 12 hours at 60° C.

The yield is 118 pounds of propylene-ethylene copolymer.

The same 82 gal. reactor is charged with solvent and catalyst as above. Propylene is polymerized at 450 p.s.i.g and 150° C. for 12 hours. Without venting the reactor, ethylene is added to a pressure of 475 p.s.i.g. and the polymerization continued for 15 minutes. The polymer solution is filtered and concentrated and the polyallomer hexane extracted for 12 hours at 60° C. The crystallinity of the gross polyallomer is 86 percent and the yield of hexane extracted polyallomer is 95 pounds.

The physical properties of the above polymers are set forth in the following table. For comparison, the properties of a blend of 2.5 percent, by weight, linear polyethylene (melt index 0.25, density 0.970) and 97.5 percent. by weight, polypropylene are also set forth.

TABLE 14

| | Poly-allomer | Copoly-mer | Blend |
|---|---|---|---|
| Weight percent ethylene | 2.6 | 2.8 | 2.5 |
| Flow rate at 230° C. using a 2,160 g. load; (ASTM D1238) | 2.7 | 2.4 | 2.5 |
| Density (ASTM D1505-57T) | 0.9025 | 0.8732 | 0.9115 |
| Brittleness temperature, ° C | −25 | −32 | +3 |
| Inherent viscosity in Tetralin, 0.25 conc. at 145° C | 1.80 | 1.78 | 1.82 |
| Tensile strength, 2 in./min., at yield, p.s.i | 3,470 | 2,100 | 4,550 |
| Stiffness in flexure, p.s.i | 85,500 | 44,000 | 140,200 |
| Hardness, Rockwell R Scale | 65 | 45 | 93 |
| Tensile impact strength, p.s.i. (ASTM D1822-61T) | 125 | 120 | 34 |
| Izod impact strength at 23° C. (ASTM D256-54T): | | | |
| Notched | 2.5 | 9.6 | 0.5 |
| Unnotched | (¹) | (¹) | (¹) |

¹ Twist.

EXAMPLE 19

As previously indicated polyallomers which exhibit a particularly unique balance of properties can be prepared by polymerizing propylene in one stage and alternatively polymerizing a mixture of propylene and ethylene in a separate first or second stage. Polyallomers with a superior combination of properties are produced by polymerizing propylene in a first stage, introducing propylene and ethylene into a second stage containing the preformed polypropylene chain and reaction system of the first stage, and then introducing propylene into a third stage containing the polymer and reaction system of the second stage. Catalysts containing titanium trichloride as one of the components give high yields of hexane-insoluble block copolymers or polyallomers when this process is employed. To illustrate:

Polyallomers having polymerized ethylene contents of 0.4, 1.0, 1.6 and 2.5 percent were prepared by high temperature solution polymerization in the above continuous three-reactor system. The synthesis section consists of three closed loop, tubular reactors operating in series, each reactor having a volume of 800 gallons. Temperatures ranging from 140–165° C. and pressures ranging from 900–1500 p.s.i.g. are employed. The percent of the components are all based on total weight of reactor contents. Propylene, mineral spirits and a catalyst consisting of lithium aluminum hydride, hydrogen-reduced TiCl₃ and sodium fluoride in a 0.8/1/0.5 mole ratio are fed to the first reactor. The effluent from the first reactor which is a solution under pressure containing about 25–35 percent polypropylene chains, 25–40 percent propylene monomer, mineral spirits and catalyst is fed to the second reactor. Additional propylene is fed to the second reactor in the amount required to maintain propylene monomer at 25–40 percent, mineral spirits in the amount required to keep the polymer concentration below 35 percent, and ethylene in amounts to give desired properties in the final polyallomer. The effluent from the second reactor containing 30–35 percent polymer solids in mineral spirits, propylene monomer, and negligible concentrations of ethylene is fed to the third reactor. Additional propylene is fed to the third reactor to maintain a monomer concentration of 20–30 percent and mineral spirits is added at the rate required to maintain a polyallomer concentration in the third reactor effluent of 30–35 percent.

From the third reactor the polymer solution is fed through a filter to remove catalyst. The substantially catalyst-free polymer solution is concentrated to 70–80 percent and extruded into strands, cooled in a water bath and chopped into pellets. The pellets are extracted with hexane at 68–69° C. for 12 hours and dried. The hexane insolubles ranged from 85–88 percent.

The polyallomers produced according to the above procedure have the following properties.

TABLE 15

| Property | Run No. | | | |
|---|---|---|---|---|
| | 1 | 2 | 3 | 4 |
| Flow rate, deg./min | 3.0 | 2.1 | 2.0 | 2.5 |
| Ethylene, percent | 0.4 | 1.0 | 1.6 | 2.5 |
| Density (annealed), g./cc | 0.910 | 0.906 | 0.903 | 0.901 |
| Softening point, Vicat, ° C | 140 | 136 | 132 | 125 |
| Tensile yield strength, p.s.i | 4,500 | 3,850 | 3,450 | 3,200 |
| Stiffness in flexure, 10⁵ p.s.i | 1.36 | 1.18 | 0.90 | 0.85 |
| Rockwell hardness, R scale | 86 | 75 | 67 | 60 |
| Izod impact strength: | | | | |
| Notched at 23° C | 0.7 | (¹) | (¹) | (¹) |
| Unnotched at 23° C | 17 | (²) | (²) | (²) |
| Unnotched at −18° C | 6 | 10 | (¹) | (¹) |
| Brittleness temperature, ° C | −5 | −10 | −22 | −30 |

¹ Incomplete break.
² No break.

EXAMPLE 20

As previously indicated, the number and length of blocks in a polyallomer are subject to wide variation depending on such factors as polymerization steps and conditions. When the monomers are propylene and ethylene, and when the transition metal compound employed in the catalyst is a titanium halide, block copolymer is formed even in those stages where the monomers are added simultaneously. A polyallomer with a particularly useful combination of properties is obtained by first polymerizing a mixture of propylene and ethylene and then finishing the polymerization by adding propylene to the preformed copolymer of propylene and ethylene. To illustrate:

A 5-liter flask equipped with a stirrer is charged with 3000 ml. of mineral spirits. The catalyst is formed by adding 15 grams of ball-milled hydrogen-reduced TiCl₃ and 100 ml. of a 25 percent solution of diethyl alluminum chloride in mineral spirits to the reaction flask. Propylene and ethylene in a mole ratio of 3 to 2 are then fed into the reaction flask for 1.5 hours while maintaining the temperature at 45° C. A weight gain of 104 grams was noted. The ethylene feed is stopped and propylene feed is continued to the flask for 6 hours while holding the temperature at 65° C. Hydrogen is fed with the propylene at the 500-p.p.m. level to control the molecular weight. Isobutyl alcohol is added to quench the reaction and the polymer is filtered out and washed to remove catalyst. The yield of gross polymer is 494 grams. Properties of the hexane insoluble polymer are: inherent viscosity 2.0, flow rate 2.5, 6.5 percent ethylene, density 0.906, brittleness temperature, ° C., −53, stiffness in flexure 110,000, tensile strength 3900, and notched Izod impact strength at 23° C.—no break.

The propylene-α-monoolefinic hydrocarbon polyallomers are preferred for many applications by virtue of their very excellent combination of physical properties, including, for example, very low brittleness points. However, it is also possible to modify the crystalline polymerized propylene polymer chains with one or more other polymerizable monomers containing one or more $$-CH_2-CH<$$

groups or more particularly, one or more $CH_2=C<$ groups as exemplified by vinyl esters, amides, nitriles, ketones, halides, ethers, α,β-unsaturated acids or esters thereof, olefins, substituted olefins, diolefins, alkynes and the like. Suitable monomers of this type, therefore, include acrylonitrile, methacrylonitrile, vinylidene chloride, methyl vinyl ketone, vinyl acetate, ethyl acrylate, methyl methacrylate, vinyl pyridines, N-substituted acrylamides, fumaric, maleic and itanonic acids, 2-chloro ethyl ether, acrylic acid, methacrylic acid, N-vinyl succinimide, N-vinyl phthalimide, N-vinyl pyrrolidone, butadiene, isoprene, vinylidene cyanide, acetylene, methylacetylene and the like. Of this latter group, the propylene polyallomers in which as little as 20 percent, by weight, or even less than 1 percent, by weight, are segments of one or more diolefins or alkynes are of particular interest. Such polymers are unique in that they exhibit an increased tensile strength and stiffness when compared with crystalline polypropylene containing no diolefin or alkyne, as well as a brittleness temperature which is at least as good as such crystalline polypropylene. Included within this group of propylene polyallomers are those containing as little as 0.1 percent, by weight, of segments of 1,3-butadiene, isoprene, 2-ethyl-1,3-butadiene, 2,4-dimethyl butadiene, 1,1,4,4-tetramethylbutadiene, piperylene, acetylene, methyl acetylene and the like. The range of polyallomers affords a variety of polymers with combinations of properties hitherto unattainable to the extent made possible hereby.

By virtue of their improved properties the propylene polyallomers, and particularly propylene-α-monoolefinic hydrocarbon polyallomers, can be used as substitutes for crystalline polypropylene in applications where their low brittle points are of significance. The propylene polyallomers have many advantages in specific areas. For example, in fibers and monofilaments the propylene polyallomers, particularly propylene-ethylene polyallomers, are superior to crystalline polypropylene in that they draw down less and afford tougher filaments resulting in fewer breaks when spinning the finer deniers. Such fibers and filaments can be made in varying deniers and cross sections, and find use as staple or continuous filaments, yarns and tows, both bulked and unbulked. Such polyallomer fibers, filaments, tow and yarns find use in textile applications, rugs, industrial fabrics, batts, filters (including cigarette filters) and various other applications where the unique combination of properties characteristic of polyallomers make them particularly useful. In films, the propylene polyallomers have superior toughness, tear resistance and impact strength while exhibiting excellent optical properties. These same advantages also apply to magnetic tape base and photographic film base prepared from propylene polyallomers, particularly propylene-α-monoolefinic hydrocarbon polyallomers. In wire covering and cable jacketing propylene polyallomers offer the advantage of better impact strength, elongation, stress crack resistance and low temperature toughness. The same advantages can be attained when the propylene polyallomers are employed in paper coatings as well as in other surface coatings and laminates with both fibrous and non-fibrous materials, such as laminates with other resins on other polyallomers or with foils or the like. In molded and extruded articles, one very significant advantage of the propylene polyallomers, and particularly propylene-ethylene polyallomers are improved impact strength and low temperature toughness.

In all of the aforementioned uses, the ease of processability of propylene polyallomers is an important advantage over many of the high molecular weight solid polymers known in the prior art, for example, high density polyethylene and acrylonitrile-butadiene-styrene polymer resins. In addition, propylene polyallomers in which the crystalline polymerized propylene chains are joined to crystalline segments of ethylene and styrene, i.e., propylene-ethylene-styrene polyallomers, exhibit extremely high stiffness, toughness and hardness, physical properties closely approximating those of acrylonitrile-butadiene-styrene polymer resins and a greater ease of molding than the latter. Moreover, propylene-ethylene vinyl chloride polyallomers are, in fact, internally plasticized polyvinyl chloride. Hence, the vinyl chloride component imparts stiffness, hardness and flame retarding properties while the propylene and ethylene components impart toughness and ease of processability. Furthermore, the chlorine atoms in these polyallomers can be hydrolyzed to produce dye-receptive hydroxy groups attached directly to the polymer chain. Also many of the polyallomers, particularly those containing a crystalline vinyl segment, exhibit unusual dyeing characteristics without further treatment.

The propylene polyallomers disclosed herein can be stabilized with a variety of antioxidants, alone in admixture. Thus, for example, the N,N-dialkyl dithiocarbamates, alkyl phenyl salycilates, N,N-diphenyl-p-phenylenediamines, 2-hydroxy benzophenones or butylated hydroxy toluenes and the like can be employed with good results. Specific antioxidants which can be employed include 4,4'-butylidene-bis(6-tert. butyl-meta-cresol), dilauryl-3,3'-thiodipropionate, N-butylated-p-amino phenol, N,N'-disecondary-butyl-p-phenylenediamine, 2,6-ditertiarybutyl-p-cresol, 2,6-ditertiarybutyl-4-methyl phenol, disalicylal propylene di-imine, N,N-disalicylidene-1,2-diaminopropane, N,N'-di(1-methyl heptyl)-p-phenylenediamine, N,N'-di-2-octyl-p-phenylenediamine, N,N'-di(1-ethyl-3-methyl pentyl)-p-phenylenediamine, N,N'-di-3(5-methyl heptyl)-p-phenylenediamine, N-1, N-3 dioleoyldiethylene triamine, cresylic acid, diacetone alcohol, isopropanol, toluene, mixed xylenes, butylated hydroxyanisole, butylated hydroxy-toluene, propyl gallate, citric acid, propylene glycol, vegetable oil, sodium silico aluminate, mixed glycerides, glyceryl monooleate, diisobutyl adipate or mixtures thereof. A particularly effective synergistic mixture is one comprising dilauryl thiodipropionate with 4,4'-butylidene-bis (6-tert. butyl-meta-cresol), or butyl hydroxy toluene. Metal soaps such as calcium sterate can be added, preferably at concentrations of 1 percent or less, to enhance stability and improve mold release properties of the polyallomers. Slip agents such as oleamide or erucrylamide or antiblock agents such as colloidal silica may also be added particularly where the propylene polyallomers are to be used for fiilm. Furthermore, pigments, extender, plasticizers or fillers, as exemplified by titanium oxides, calcium hydroxide, synthetic rubbers, or silicates, can be added to the polyallomers. For use in fiber formation, mixtures of polyallomers, particularly propylene polyallomers, with polyesters or polyamides, for example, nylon, can be used in order to obtain improved dye affinity together with optimum fiber properties. In addition, the propylene polyallomers can be thermally degraded at temperatures above their circuit temperature to form useful products. Low molecular weight liquid and waxy polyallomers also can be made and show excellent adaptability for specialized uses. The polyallomers are also used in wrapping materials, fluid containers, fluid conduits or like articles.

The following examples will further illustrate the comprehensive nature of the present invention as expressed by the process which comprises introducing an α-monoolefin of 2–10 carbons into a polymerization system containing a stereospecific polymerization catalyst and a polymer of a different one of said α-monoolefins to form a copolymer of high crystallinity. It is particularly noted that highly useful copolymers are also obtained where the first monomer from the first homopolymer preparation is present during the polymerization of the second monomer.

EXAMPLE 21

Gaseous isobutylene was introduced into a catalyst mixture from 5.0 mil. of aluminum triethyl and 2.4 ml. of titanium tetrachloride in 500 ml. of heptane until 30 g. had been absorbed. The flow of isobutylene was then stopped and ethylene was introduced for 3 hours. The reaction vessel was cooled frequently to maintain the reaction temperature at 60° C.

The crude copolymer was heated with 500 ml. of 1% methanolic sodium hydroxide solution and washed several times with methanol. The pure isobutylene-ethylene copolymer weighed 124 g. and had a melt index of 2.53.

EXAMPLE 22

A catalyst solution composed of 8.0 g. ($2.1 \times 10^{-2}$ mole) of ethyl aluminum sesquibromide and 3.1 g. ($5.5 \times 10^{-3}$ mole) of tetra-2-ethylhexyl titanate in 200 ml. of heptane was added during a 1-hour period to a solution of 25 g. of styrene monomer in 275 ml. of heptane. The reaction mixture was maintained at a temperature of 70° C. under an ethylene pressure of 5 p.s.i.g. during the catalyst addition and for 3 hours thereafter. Catalyst was removed from the crude product by the usual methanol and methanol-caustic treatment. The ethylene-styrene copolymer weighed 61 grams. The melt index was less than 0.001 and the melting point was greater than 160° C.

EXAMPLE 23

Ethylene was contacted at atmospheric pressure at 50–60° C. with a catalyst mixture prepared from 5.0 ml. of aluminum triethyl and 2.4 ml. of titanium tetrachloride in 500 ml. of toluene until 40 g. of ethylene had been absorbed. Ethylene flow was interrupted and gaseous isoprene was fed to the reaction mixture until 33 g. had absorbed. Ethylene was then supplied to the reaction mixture until it became too thick to stir efficiently. Methanol was added and the product polymer was recovered by filtration. Last traces of catalyst were removed by washing with 2% sodium methoxide in methanol solution and finally with pure methanol. The ethylene-isoprene copolymer weiged 107 g., melted at 155–172° C., and had a melt index of 0.001.

EXAMPLE 24

A solution of 20 g. of 3-methyl-1-butene in 20 ml. of heptane was added dropwise to a catalyst mixture prepared from 2.3 grams of aluminum triethyl and 1.53 grams of titanium trichloride in 250 ml. of heptane. The mixture was stirred and heated at 60–70° C. for twenty minutes. Additional heptane (250 ml.) was added and gaseous ethylene was introduced beneath the surface of the mixture for 4 hours. Reaction temperature was maintained at 60–70° C. throughout the addition of ethylene. Isobutanol containing 1% KOH was added and the mixture was stirred for 20 minutes. The 3-methyl-1-butene copolymer with ethylene was further purified by stirring with a fresh portion of 1% KOH in isobutanol and washed with methanol. The copolymer weighed 112 g.; specific gravity, 0.953; melting point 165–180° C.

EXAMPLE 25

A copolymer of octene-1 and ethylene was prepared by substituting 20 g. of octene-1 for the 3-methyl-1-butene in Example 24. The copolymer produced weighed 94 g.; specific gravity, 0.928; melting point 95–113° C.

From the above examples it is seen that certain aspects of the present invention can be employed to give what may be termed, modified polymers, or, in a more specific sense, block copolymers of high crystallinity. This concept is embodied in the modification or copolymerization of preformed polymeric chains of such materials as polyisobutylene with other α-monoolefins to give copolymers having highly useful balances of properties including melt index, specific gravity, tensile strength, elongation, stiffness in flexure and Vicat softening point. Such copolymers can be molded, extruded, calendered or the like and formed into flexible plates, ribbons, bands, fibers and filaments.

The invention has been described in considerable detail with particular reference to certain preferred embodiments thereof, but it will be understood that variations and modifications can be effected within the spirit and scope of the invention as described above and as defined in the appended claims.

We claim:

1. A crystalline, block copolymer of polymerized propylene units and polymerized units of at least one other α-monoolefinic hydrocarbon selected from ethylene monomers and monomers having 4 to 10 carbon atoms, said copolymers having an inherent viscosity in Tetralin at 145° C. of from about 0.4 to about 2.4, a density of at least 0.85, a brittle point below about 0° C. and containing at least 90 percent by weight of polymerized propylene.

2. The copolymer of claim 1 comprising at least 90 percent by weight of polymerized propylene and at least 0.1 percent by weight of other of said α-monoolefinic hydrocarbons in polymerized form.

3. The copolymer of claim 2 wherein said other α-monoolefinic hydrocarbon is ethylene.

4. The copolymer of cailm 2 wherein said other α-monoolefinic hydrocarbon is butene-1.

5. The copolymer of claim 2 wherein said other α-monoolefinic hydrocarbon is hexene-1.

6. The coplymer of claim 3 containing from about 0.1 to about 7 percent by weight of polymerized ethylene.

7. The coplymer of claim 3 containing less than about 5 percent by weight of polymerized ethylene.

8. Manufactured shaped articles of the copolymer of claim 1.

9. The copolymer of claim 1 wherein said other α-monoolefinic hydrocarbon is ethylene and which copolymer exhibits distinctive infrared adsorption in the regions of 13 to 14 and 9.6 microns.

10. The copolymer of claim 9 containing from about 0.1 to about 7 percent by weight of polymerized ethylene.

11. Manufactured shaped articles of the copolymer of claim 9.

12. A solid, crystalline block copolymer of claim 1 comprising at least 90% by weight of propylene, and at least 1% by weight of said other α-monoolefinic hydrocarbon.

13. The copolymer of claim 12 wherein said other α-monoolefinic hydrocarbon is ethylene.

14. The copolymer of claim 12 wherein said other α-monoolefinic hydrocarbon is butene-1.

15. The copolymer of claim 12 wherein said other α-monoolefinic hydrocarbon is hexene-1.

16. The copolymer of claim 7 comprising from about 95 to about 99.9 percent by weight of polymerized propylene.

17. The coplymer of claim 1 wherein the polymer chains of polymerized propylene units are terminated by polymerized units of said different α-monoolefinic hydrocarbon, and wherein said copolymer has a molecular weight of at least 10,000.

18. The polymer of claim 17 wherein the said α-monoolefinic hydrocarbon is ethylene.

19. The polymer of claim 17 wherein the said α-monoolefinic hydrocarbon is butene-1.

20. The polymer of claim 17 wherein the said α-monoolefinic hydrocarbon is hexene-1.

References Cited

UNITED STATES PATENTS

| | | | |
|---|---|---|---|
| 3,268,624 | 8/1966 | Jezl et al. | 260—878 |
| 3,301,921 | 1/1967 | Short | 260—878 |
| 3,318,976 | 5/1967 | Short | 260—878 |

(Other references on following page)

FOREIGN PATENTS

| | | |
|---|---|---|
| 601,560 | 2/1960 | Italy. |
| 615,048 | 1/1961 | Italy. |
| 889,230 | 2/1962 | Great Britain. |
| 941,087 | 11/1963 | Great Britain. |

OTHER REFERENCES

Natta et al.: "Properties of Isolactic, Atactic and Stereoblock Homopolymers, Random and Block Copolymers of Alpha Olefins," Journal of Polymer Science, vol. 34, 1959, pp. 542 and 543.

Australian Abstract 57,655/60, Aug. 18, 1960, Sun Oil Co.

MURRAY TILLMAN, Primary Examiner

M. J. TULLY, Assistant Examiner

U.S. Cl. X.R.

117—138.8, 161; 260—41, 45.85, 45.9, 45.95, 876

PO-1050
(5/69)

UNITED STATES PATENT OFFICE
CERTIFICATE OF CORRECTION

Patent No. 3,529,037            Dated September 15, 1970

Inventor(s) Hugh John Hagemeyer, Jr. and Marvin Becton Edwards

It is certified that error appears in the above-identified patent and that said Letters Patent are hereby corrected as shown below:

Column 1, line 27, "no abandoned" should read ---now abandoned---.
Column 8, line 9, "octane" should read ---n-octane---.
Column 8, line 18, "4-methylpenten-1" should read ---4-methylpentene-1---.
Column 8, line 69, after "139°C.," add --- a brittleness temperature of -38°C.---.

Column 13, Table 3, the Tensile impact strength for Run 4 is 64.
Column 13, Table 3, the Tensile impact strength for Run 5 is 67.
Column 14, Table 4, the Tensile strength for Run 3 should read 3,420.
Column 22, line 54, "circuit" should read ---critical---.

Signed and sealed this 14th day of September 1971.

(SEAL)
Attest:

EDWARD M. FLETCHER, JR.
Attesting Officer

ROBERT GOTTSCHALK
Acting Commissioner of Patents